United States Patent [19]
Forster

[11] 3,915,071
[45] Oct. 28, 1975

[54] PISTON FOR HYDROSTATIC MACHINES
[75] Inventor: Franz Forster, Haibach, Germany
[73] Assignee: Linde Aktiengesellschaft, Wiesbaden, Germany
[22] Filed: Aug. 22, 1974
[21] Appl. No.: 499,529

Related U.S. Application Data
[62] Division of Ser. No. 347,352, April 2, 1973, Pat. No. 3,861,278.

[30] Foreign Application Priority Data
July 28, 1972 Germany.......................... 2237240

[52] U.S. Cl. .................... 92/57; 91/488; 92/158; 92/181; 92/255
[51] Int. Cl.² ...................... F01B 31/10; F16J 1/00
[58] Field of Search .......... 91/488; 92/78, 153, 157, 92/158, 181 R, 255, 57

[56] References Cited
UNITED STATES PATENTS
2,300,009   9/1937   Rose ................................ 92/162 R
3,113,491   12/1963  Borowka............................ 92/158
3,319,575   5/1967   Havens ............................. 91/488
3,633,467   12/1969  Watanabe........................... 91/488
3,828,654   8/1974   Wiethoff........................... 91/488

FOREIGN PATENTS OR APPLICATIONS
1,529,432   5/1968   France................................ 91/488

Primary Examiner—William L. Freeh
Assistant Examiner—G. P. La Pointe
Attorney, Agent, or Firm—Karl F. Ross; Herbert Dubno

[57] ABSTRACT

A piston for hydrostatic machine, i.e. a pump or motor of the axial-piston type, comprising a filter within the body of the piston along a passage therethrough leading from the effective face of the piston to its shoe in contact with a control surface for preventing contaminants from entering the region of the fluid cushion provided at the control surface.

6 Claims, 2 Drawing Figures

PISTON FOR HYDROSTATIC MACHINES

CROSS-REFERENCE TO RELATED APPLICATION

This application is a division of copending patent application Ser. No. 347,352 filed on 2 Apr. 1973, now U.S. Pat. No. 3,861,278 for a PISTON FOR HYDRAULIC MACHINES.

FIELD OF THE INVENTION

My present invention relates to improvements in piston constructions for hydrostatic machines and, more particularly to a piston for an axial-piston pump or motor.

BACKGROUND OF THE INVENTION

An axial-piston machine, such as an axial-piston pump or axial-piston motor, may have a cylinder drum which is rotatable relative to a control surface or rotatable with a control surface inclined to the axis of the drum to displace axially inwardly and outwardly a plurality of pistons extending parallel to the drum axis in respective bores.

The cylinder bores, usually disposed in angularly equispaced relationship about the axis of the cylinder drum, open at one axial end of the cylinder drum toward a fluid-distribution plate or other member having inlet and outlet passages selectively communicating with the cylinder bores. In a hydrostatic pump of this type, the system is driven by an external energy source, e.g. an electric or combustion motor or engine so that the pistons are displaced within their cylinder bores from a position of maximum cylinder expansion to a position of maximum contraction in a cyclical manner, each reduction in size of each of the cylinder chambers displacing fluid from the pump through the outlet or high pressure passage thereof to a load. At the opposite side of the pump, the chambers expand and a fluid medium is drawn into the cylinder chambers from an intake or low pressure port forming the inlet to the system. In a hydrostatic motor of the axial-piston type, the fluid medium is forced into the cylinder bores at one side to rotate the cylinder drum or an inclined plate against which the motor pistons react, while fluid is discharged at the opposite side.

Axial-piston machines may be coupled together to provide variable-speed and variable-torque transmissions, the displacement of the pump or motor being a function of the angle at which the control plate or surface is inclined to the axis of the cylinder drum. The machines may be joined in a single housing or may be separated from one another by a considerable distance, being connected in substantially a closed hydraulic system by suitable conduits. Also a single pump may be hydraulically coupled to a number of motors or a plurality of pumps may drive one or more motors collectively or individually.

It is known to provide, in the region at which the aforementioned axial pistons react against the inclined control plate or surface, a shoe or the like in which the piston is swivelably or articulately received and which bears upon the control plate or surface, thereby maintaining firm sliding engagement between the piston and the control surface. It is also known to reduce friction between the piston and the shoe and/or between the shoe and the control plate or surface by providing a fluid cushion at the interface or these parts. The fluid cushion, i.e. a pressurized layer of the hydraulic medium, may be derived from the respective cylinder bores by forming each piston with a passage communicating between its effective face and the opposite end of the piston which projects from the cylinder drum and acts upon the control plate or surface. In the simplest configuration, the axial piston is provided with a bore extending generally over its length between the working face of the piston and the end thereof swivelably received in the shoe. It has been found that the use of a fluid cushion of this type is highly advantageous, but fraught with various problems. For example, the hydraulic medium within the piston bore, which is somewhat compressible, causes a lag (when the piston is made hollow) between the development of the working pressure in the cylinder bore and the transmission of pressure to the interface at which a fluid cushion is required.

This disadvantage may be overcome by partially filling the piston, which is made hollow to reduce its mass and hence the inertia of the system, with a body of a material having a lower specific gravity or density than the material of the piston which was originally hollow and which constitutes the outer portion of the piston. While this has the effect of increasing slightly the mass of the piston above a similarly constructed piston which is hollow, the use of lightweight materials (e.g. aluminum, magnesium or synthetic resins) within the piston bodies, where these materials are not in contact with any wear-inducing surfaces, permits the passage volume between the working end of the piston and the fluid cushion to be reduced and the lag in the development of the fluid cushion to be diminished to the point that it is not material. Consequently, the increase in mass is outweighed by the increase in the response of the fluid cushion.

Even with this modification, however, some considerable difficulty has been detected in the use of axial pistons with fluid cushions or fluid-lubricated interfaces in which the lubricating medium passes through the axial pistons to the juxtaposed surfaces at which the fluid cushion is to be formed. It has been found, for example, that contaminants, such as metal particles, which do not normally effect the operation of the cylinder drum, valve plate and the like, may be entrained with the small quantity of fluid delivered to the fluid cushion and may enter between the juxtaposed surfaces forming the sliding interface to damage these surfaces, decrease the seal produced thereby, and eventually interrupt the sealing action altogether. The problem is increased when the passage in the piston includes a constriction, as is generally desired, since the constriction often is of such fine caliber as to be readily blocked by the contaminants mentioned above.

OBJECTS OF THE INVENTION

It is the principal object of the present invention to provide an improved piston structure for axial-piston machines whereby the aforementioned disadvantages are obviated.

Another object of the invention is to provide an axial-piston machine in which disruptions and repairs resulting from the presence of contaminants in the working fluid are avoided at the juxtaposed relatively displaceable surfaces in the end of a piston for an axial-piston machine, remote from the working face of the piston.

Still another object of the invention is to provide a piston for an axial-piston machine which increases the useful life of the latter.

SUMMARY OF THE INVENTION

These objects and others which will be apparent hereinafter are attained, in accordance with the present invention, in an axial-piston machine of the general type described above wherein the liquid passage in each of the axially displaceable pistons is provided with a filter adapted to remove contaminant from the small portion of the hydraulic medium transversing each piston and delivered to the relatively displaceable surfaces of the interface formed at the piston and remote from its working face.

It is to be understood that the working medium in such machines generally is passed through a filter and that the filter provided in each of the axial pistons is not to be considered a substitute for the main filter through which the greater part of the hydraulic medium is continuously circulated. In other words at least two distinct filtering actions are provided, the first or main filtering action takes place in the hydraulic power-fluid path while the secondary filtering operation operates only on the minor quantities of the hydraulic medium transversing the axial pistons. Since the fluid diverted from the power path eventually becomes a leakage fluid, particles which are not entrained in the path of the main circulation remain for prolonged periods in the medium outside of this path in prior art axial-piston machine, but are removed by the piston filters in accordance with the present invention. The closed-circuit machines also may circulate contaminated fluid for long periods without contact with a main filter.

The filter provided in each of the axial pistons removes the contaminants (e.g. metal particles), before they reach locations at which damage to the machine may be caused. In other words, the contaminant particles are prevented from reaching either the constriction in the passages of the axial pistons or the interface between the axial piston and its shoe and/or between the shoe and the control surface or plate.

According to another feature of the invention, however, all or part of the constriction or throttling effect required along the passage may be formed by the filter. The use of a filter, with a multiplicity of openings, perforations or the like, while having the same throttling effect as a small-diameter bore, can be employed in spite of the fact that contaminant particles collect upon the filter because numerous other pathways through the filter are afforded even through some of the openings may be blocked.

Preferably, the life span of the filter, i.e. the period for which the machine can be operated until the filter of the axial piston is blocked and the pressure cushion at the interface deteriorates, is selected so as to be equal to or greater than the useful life of the machine as a whole, so that no interruption of service is necessary to clear the filter. However, the filter may be made removable if replacement of the piston is contemplated. The useful life of the filter can be made a maximum when the filter area is relatively large and, to this end, it is preferred to provide the filter extending axially over the major part of the length of the piston and preferably over substantially the entire length thereof from the effective piston face to the joint at which the piston engages the shoe.

According to another feature of this invention, the piston is hollow, i.e. provided with a cylindrical compartment extending substantially the full length of the filter and terminating at the working face of the piston and, is filled with a body of low specific gravity or density as described. This body may be a plug which is received within the interior of the piston.

According to another feature of the invention the plug or filter body may itself be porous to constitute the filter.

The axial piston should be provided with passages directing the fluid generally radially as it is forced through the piston.

DESCRIPTION OF THE DRAWING

The above and other objects, features and advantages of the present invention will become more readily apparent from the following description, reference being made to the accompanying drawing in which.

SPECIFIC DESCRIPTION

Figure 2:
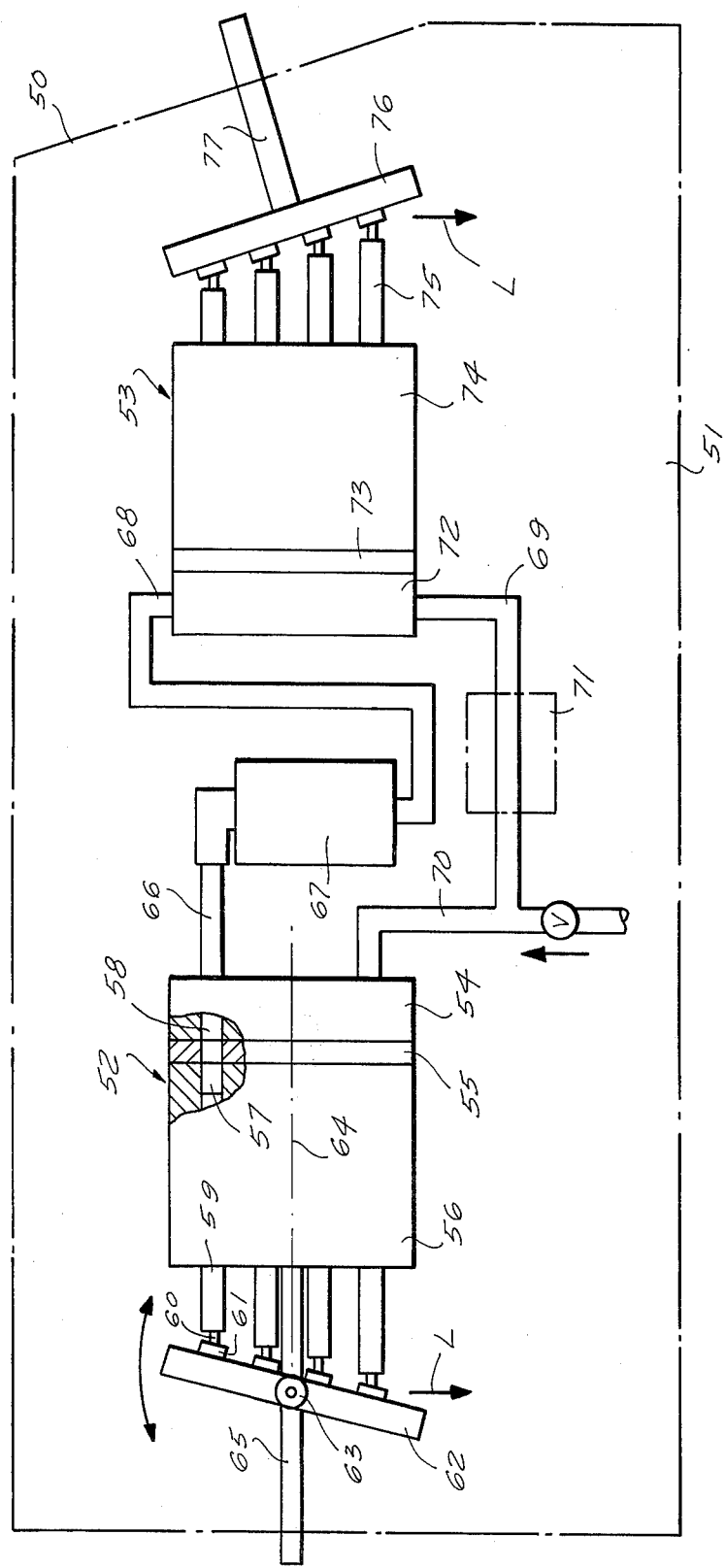
FIG. 2 is a diagrammatic elevational view, partly broken in a way of hydraulic machine according to the invention.

Referring first to FIG. 2, it can be seen that a hydrostatic system employing the present invention may include a housing 50 forming a sump 51 at the bottom thereof for leakage of the hydraulic medium, in which a hydrostatic pump 52 and a hydrostatic motor 53 are mounted.

The hydrostatic pump 52 comprises a stationary plate 54 against which a fluid-distribution plate 55 is held by the axial pressure exerted thereon by a cylinder drum 56. The cylinder drum axially bears upon the fluid distribution plate 55 as described, for example, in U.S. Pat. Nos. 3,292,552 and 3,495,542. The cylinder 56 is formed with angularly equispaced cylinder bores 57 opening at their right hand ends toward the plate 55 and successively registering with the ports 58 thereon.

Each of the cylinder bores 57 slidably receives a piston 59 which is axially reciprocal within the respective bore and has a ball-shaped head 60 swivelably received in a sliding shoe 61 bearing against a nonrotatable angular control plate 62. The piston is constructed as described in connection with FIG. 1.

The control plate 62 is swingable about an axis 63 perpendicular to the axis of the drum and is formed with a central clearance through which the driveshaft 65 extends. The shaft 65, which projects from the housing 50, is connected to the cylinder drum 56 to rotate the latter.

The high pressure side or outlet 66 of the pump is connected via a filter 67 with the intake portion 68 of the hydrostatic motor 53 while the low pressure side 69 thereof is returned to the intake port 70 of the sump. The main filter may, of course, be disposed in the return line as represented diagrammatically at 71.

The hydrostatic motor 53 comprises a plate 72 formed with the inlet and outlet ports 68 and 69, the fluid distribution plate 73, a cylinder barrel 74, and axial pistons 75 acting upon an inclined plate 76 which is connected with the shaft 77 to rotate the latter. The principles of such pumps and motors are described at pages 109 – 112 and 199 – 200 of FLUID POWER, U.S. Government Printing Office, Washington, D.C. 1966.

In general, when the shaft 65 is rotated, the cylinder drum 56 is entrained to carry the pistons 59 around the axis 64 relative to the control plate 62 which remains stationary. Depending upon the angle of inclination of this plate (which may be controlled by conventional means from a location outside the housing), the pistons are urged inwardly or permitted to move outwardly, thereby varying the fluid volume of the cylinder bores and displacing fluid to the motor. The fluid entering the cylinder bores of the latter urges the pistons outwardly and thus rotates the rotor assembly whose control plate angle can be similarly adjusted by means not illustrated but conventional in the art. Between the cylinder drum 56 and the distribution plate 55 and the corresponding components of the motor, there is some fluid leakage which collects in sump 51. In addition, the pistons 59 and 75 are provided with passages adapted for form fluid cushions at the appropriate interfaces, the fluid from these cushions eventually collecting in the sump 51 as represented by the arrow L.

Figure 1:
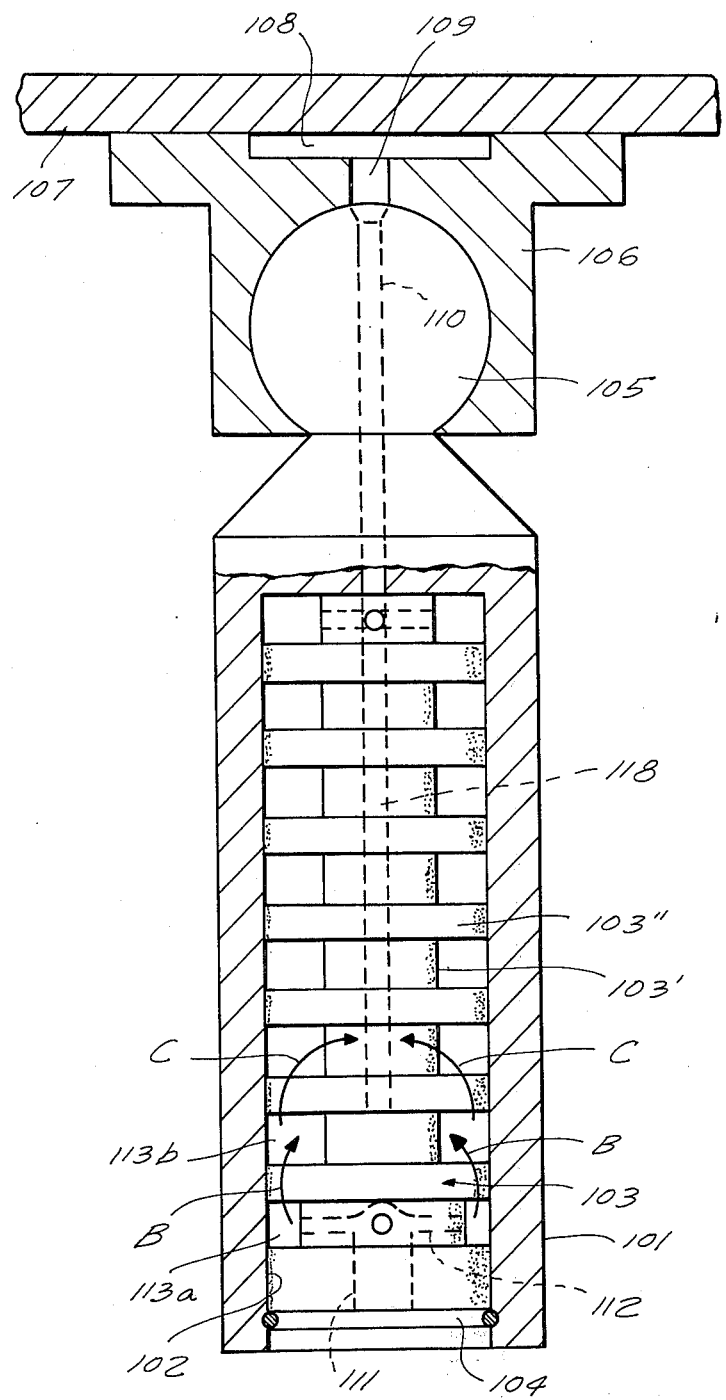
FIG. 1 is an axial cross-sectional flow through a piston according to the present invention.

In FIG. 1 a piston 101 is formed with a central cavity 102 receiving a plug 103 which is held in place by a snap ring 104. The plug 103 is composed of porous sintered metal (e.g. sintered aluminum) or another material having a low specific gravity, and serves as a filter, although a screen can also be used. The plug 103 is composed of cylindrical small-diameter portions 103' between large-diameter portions 103" so that, when fluid is forced into the body 103 through the bore 111 and then passes through annular compartments 113a, 113b, etc. via bores 112, the fluid passes through the large-diameter portions 103" (arrows B) and/or radially through the small-diameter portions 103' as represented by arrow C; eventually passing through the central bore 118 thence to the head of the piston. Thus the plug forms both the filter and the constriction.

At its end adapted to project from the cylinder body, the piston 103 is provided with a ball-shaped head 105 swivelably received in a sliding shoe 106 which is adapted to slide relative to the surface of a control plate 107 (e.g. member 62 of FIG. 2). The shoe 106 is formed with a recess 108 opening in the direction of the member 107 and communicating via an axially extending bore 109 in this shoe, with an axial bore 110 through the head of the piston. When hydraulic medium is supplied under pressure through bores 109 and 110 to the recess 108, a hydraulic pressure cushion is provided between the faces of the shoe 106 and member 107 which serves to urge the pistons axially inwardly toward the cylinder drum and provide a lubricated interface between these two relatively slidable members 106 and 107. A similar cushion may form between the shoe 106 and the head 105.

I claim:

1. A piston for an axial-piston hydrostatic machine, wherein said piston at one end reacts against a surface and defines a pressure cushion therewith the other end is receivable in a cylinder, said piston comprising:

an elongated piston body having a longitudinal axis and an axially extending cavity opening at said other end of said body, said body being formed with a body passage of smaller cross-sectional area than said cavity and extending between said cavity and said one end of said body;

a plug of porous material in said cavity and having lower specific gravity than said body, said plug having a radially open annular groove defining an annular chamber in said cavity and said plug being formed with a plug passage extending between said chamber and said body passage, whereby oil under pressure in said cylinder passes through said plug into said chamber and thence through said passages to said cushion; and means for securing said plug in said cavity.

2. The piston defined in claim 1 wherein said plug is formed with a plurality of shoulders axially subdividing said cavity into a plurality of such chambers.

3. The piston defined in claim 2 wherein said plug passage extends through most of the axial length of said plug, whereby oil in most of said chambers can pass through said plug into said plug passage.

4. The piston defined in claim 1 wherein said means is a snap ring.

5. The piston defined in claim 1 wherein said body is made of steel and said plug is a sintered metal.

6. The piston defined in claim 5 wherein said metal is aluminum.

* * * * *